US009706086B2

(12) United States Patent
Lawrence

(10) Patent No.: US 9,706,086 B2
(45) Date of Patent: Jul. 11, 2017

(54) CAMERA-ASSISTED DISPLAY MOTION COMPENSATION

(71) Applicant: Intel Corporation, Santa Clara, CA (US)

(72) Inventor: Sean J. Lawrence, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 15 days.

(21) Appl. No.: 14/835,848

(22) Filed: Aug. 26, 2015

(65) Prior Publication Data

US 2017/0064157 A1 Mar. 2, 2017

(51) Int. Cl.
| *H04N 5/228* | (2006.01) |
| *H04N 5/225* | (2006.01) |
| *G06T 7/20* | (2017.01) |
| *G06T 7/00* | (2017.01) |
| *H04N 5/232* | (2006.01) |
| *G06F 3/147* | (2006.01) |

(52) U.S. Cl.
CPC ............ *H04N 5/225* (2013.01); *G06F 3/147* (2013.01); *G06T 7/0044* (2013.01); *G06T 7/2053* (2013.01); *H04N 5/23248* (2013.01); *G06T 2207/10016* (2013.01); *G06T 2207/30201* (2013.01)

(58) Field of Classification Search
CPC ........... H04N 5/23248; H04N 5/23251; H04N 5/23258; G06F 3/013; G06F 1/1626; G06F 1/1686; G06F 1/1694; G06F 2200/1637
USPC ................. 348/208.99, 208.1–208.4, 208.12
See application file for complete search history.

(56) References Cited

U.S. PATENT DOCUMENTS

| 7,605,845 | B2 | 10/2009 | Batur | |
| 7,903,166 | B2 * | 3/2011 | Daly | .................. G06T 5/006 |
| | | | | 345/672 |
| 8,970,495 | B1 * | 3/2015 | Biffle | ..................... G09G 3/003 |
| | | | | 345/158 |
| 2008/0036875 | A1 * | 2/2008 | Jones | ................. H04N 5/23238 |
| | | | | 348/222.1 |
| 2008/0199049 | A1 | 8/2008 | Daly | |
| 2011/0194612 | A1 * | 8/2011 | Tsai | ...................... H04N 19/59 |
| | | | | 375/240.16 |
| 2014/0104167 | A1 | 4/2014 | Plestid | |
| 2014/0111550 | A1 | 4/2014 | Abraham et al. | |
| 2014/0368508 | A1 * | 12/2014 | Kunchakarra | .......... G09G 5/30 |
| | | | | 345/428 |
| 2015/0138379 | A1 | 5/2015 | Auberger et al. | |
| 2015/0271408 | A1 * | 9/2015 | Cancel Olmo | ......... G06F 3/013 |
| | | | | 348/208.6 |

(Continued)

OTHER PUBLICATIONS

International Search Report and Written Opinion, mailed Nov. 3, 2016, for PCT Patent Application No. PCT/US2016/043945.

*Primary Examiner* — Kelly L Jerabek
(74) *Attorney, Agent, or Firm* — Green, Howard & Mughal LLP

(57) ABSTRACT

A camera affixed to a device including a display has the display viewer within the camera field of view (FOV). The camera is employed to track the movement of the display viewer's eyes and/or face and/or head with respect to the camera and display. A relative motion is determined based on the camera viewer tracking data. Content frame position within the display screen area is compensated based on the relative motion and displayed on the screen for a better, less-irritating viewing experience.

16 Claims, 13 Drawing Sheets

(56) References Cited

U.S. PATENT DOCUMENTS

2016/0205323 A1* 7/2016 Jiang .................. G06T 5/50
348/208.4

* cited by examiner

CAMERA-ASSISTED DISPLAY MOTION COMPENSATION

BACKGROUND

Mobile displays are pervasive in modern culture. Laptops, tablets, handheld devices, automotive displays, and displays found in public transit are some examples. Because of the their mobility, they are frequently employed to display content to viewers who are in transit (e.g., while commuting or traveling in a automobile, bus, subway, train, airplane or other vehicle). Even vehicle operators may use mobile or compact vehicle displays for navigation and vehicle condition assessment, communication, etc. For example, small displays are often used for automobile and airplane navigation and instrumentation. In these transportation applications, there is often a great deal of movement between the viewer and the display, for example because of irregular road surfaces or atmospheric conditions. This movement often results in an undesirable and aperiodic vibration or random shaking referred to herein as motion jitter. Such motion jitter can make reading a document or other content on the display difficult and/or irritating to the viewer (user). Display shake or motion jitter is due to the hand and/or vehicle infrastructure holding the display having a different degree of motion than the display viewer's eyes. For a handheld device, this differing degree of motion is generally a result of the display and viewer's head/eyes being coupled to different points on the human body. For a vehicle-mounted display, the differing degree of motion is generally a result of the display and viewer being coupled to different points on a vehicle platform. Because the display screen remains fixed with respect to the display device, the resulting relative motion between the eyes and the display screen content can be a source of viewer irritation and motion sickness.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION OF EXEMPLARY EMBODIMENTS

Figure 1A:
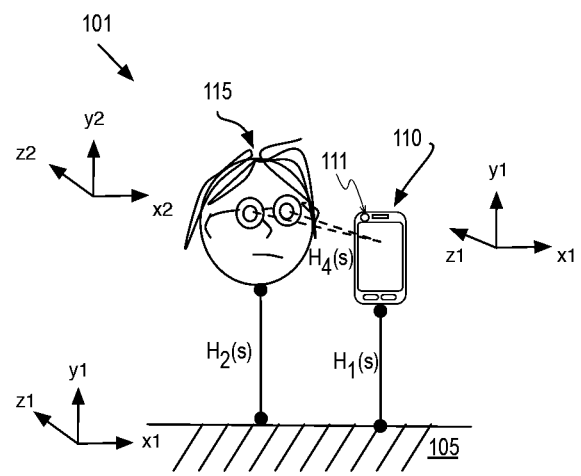
FIG. 1A is a schematic depicting a display device and a viewer coupled to different points on a vehicle platform, in accordance with some embodiments.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and in the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth embodiments that may be manifested in architectures, such system-on-a-chip (SoC) architectures for example, implementation of the techniques and/or arrangements described herein are not restricted to particular architectures and/or computing systems, and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein may be implemented in hardware, for example with a programmable microprocessor, vector processor, or ASIC. Certain portions may be implemented in hardware, firmware, software, or any combination thereof. At least some of the material disclosed herein may also be implemented as instructions stored on a machine-readable medium, which may be read and executed by one or more processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

In some embodiments described in herein, a camera rigidly affixed to a device including a display has the display viewer within the camera field of view (FOV). The camera is employed to track the movement of the display viewer's eyes and/or face and/or head with respect to the camera and display. A relative motion is determined based on camera object tracking data to compensate rendering of the content onto the display area for a better, less-irritating viewing experience.

FIG. 1A is a schematic depicting a system 101 including a display device 110 and a viewer 115 coupled to different points on a vehicle platform 105, in accordance with some embodiments. System 101 is typical of "connected" vehicle applications. Vehicle platform 105 is associated with motion jitter vectors $x_1$, $y_1$, and $z_1$. Display device 110 is physically coupled to vehicle platform 105. The coupling between device 110 and vehicle platform 105 may be described mathematically by a "device motion jitter" transfer function $H_1(s)$, relating an input $X_1$ associated with motion jitter vectors $x_1$, $y_1$, and $z_1$ to an output $Y_1$. In the exemplary embodiment, device 110 is rigidly affixed to vehicle platform 105 such that $H_1(s)$ simplifies to unity and an $X_1$ input generates a $Y_1$ output described by motion jitter vectors $x_1$, $y_1$, and $z_1$. In some embodiments, $x_1$ corresponds a horizontal dimension of a display screen of device 110, $y_1$ corresponds to a vertical dimension of the display screen and $z_1$ correspond to depth dimension perpendicular to the plane of the display. Viewer 110 is likewise physically coupled to vehicle platform 105, for example sitting or standing in vehicle platform 105. The physical coupling between the vehicle and the display viewer's head or eyes may be mathematically described by a "head/eye motion jitter" transfer function $H_2(s)$, relating the input $X_1$ associated with motion jitter vectors $x_1$, $y_1$, and $z_1$ to an output $Y_2$ associated with motion jitter vectors $x_2$, $y_2$, and $z_2$. Transfer function $H_2(s)$ is generally not unity and can be expected to change over time as viewer 110 adjusts their physical coupling to vehicle platform 105.

Figure 1B:
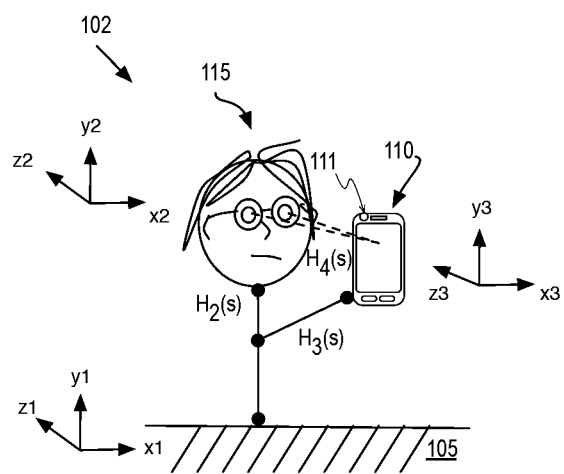
FIG. 1B is a schematic depicting a display device coupled to a vehicle platform through a device viewer, in accordance with some embodiments.

FIG. 1B is a schematic depicting a system 102 including a display device 110 coupled to vehicle platform 105 through viewer 115, in accordance with some embodiments. System 102 is typical for handheld display device (e.g., smartphone) applications. For such embodiments, display device 110 is physically coupled to vehicle platform 105 through display viewer 115. The physical coupling between the vehicle platform and display viewer's head or eyes is again described by head motion jitter transfer function $H_2(s)$, relating the input $X_1$ associated with motion jitter vectors $x_1$, $y_1$, and $z_1$ to an output $Y_2$ associated with motion jitter vectors $x_2$, $y_2$, and $z_2$. The coupling between display device 110 and vehicle platform 105 however may be described mathematically by a "hand motion jitter" transfer function $H_3(s)$, relating an input $X_1$ to an output $Y_3$ associated with motion jitter vectors $x_3$, $y_3$, and $z_3$. In such embodiments, neither $H_2(s)$ not $H_3(s)$ will likely be unity and can be expected to change over time as viewer 115 adjusts their coupling to both display device 110 and vehicle platform 105.

For both systems 101 and 102, because device motion and viewer head/eye motion respond to a same input stimulus, the two can be mathematically correlated, for example by a relative motion jitter transfer function $H_4(s)$, denoted in FIG. 1A, 1B by dashed lines between the viewer's eyes and display device 110. In exemplary embodiments, display device 110 further includes an integrated camera 111, which is configured to collect time consecutive image frames (i.e., video data) that capture the viewer of the display. With image processing algorithms, movement of the display viewer's eyes, face, and/or head with respect to display device 110 may be tracked. A description of this relative motion jitter is further determined based on at least this object tracking data. Depending on the embodiment, the relative motion jitter description may be a real-time direct measurement of the relative motion jitter, or may be an estimate of relative motion jitter predicted on the basis of a secondary measurement, such as device motion jitter. This real-time or predicted estimate of relative motion jitter is then employed within a content rendering pipeline to compensate presentation of the content onto the display screen of device 110 for a better, less-irritating viewing experience.

Figure 2:
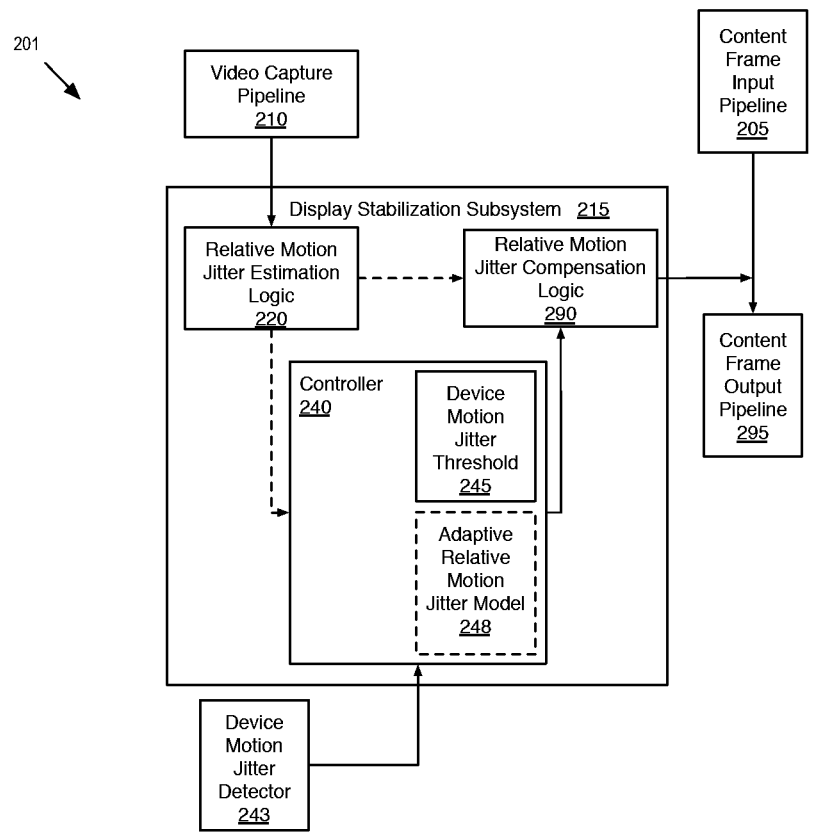
FIG. 2 is a schematic of a display device architecture for compensating relative motion jitter in content frames output to a display screen of a display device, in accordance with some embodiments.

FIG. 2 is a schematic of a display device architecture 201 for compensating relative motion jitter in content frames output to a display screen of the device, in accordance with some embodiments. Architecture 201 includes a video capture pipeline 210, which for example, begins with a video camera. Architecture 201 further includes a content frame rendering pipeline, which for example, includes a content frame input pipeline 205 and a content frame output pipeline 295. Content frame rendering pipeline comprises hardware responsible for generating any content output to a display screen for presentation to a viewer. Content frame output pipeline 295 terminates, for example, at an integrated display screen.

In accordance with some embodiments, a video-assisted display stabilization subsystem 215 is coupled into the content rendering pipeline. Display stabilization subsystem 215 may share some components with a video stabilization system. However, whereas a video stabilization system is to remove motion instability (i.e., motion jitter) from recorded video frame content, display stabilization subsystem 215 is to remove relative motion instability (i.e., relative motion jitter) of a display presenting stable content. A video stabilization system, for example, may employ image processing algorithms and/or hardware motion sensors to remove from recorded video frames motion jitter experienced by a recording device so the recorded image frames may then be displayed in a stable manner within a display screen area. Such image processing may include motion estimation and motion compensation algorithms. Motion estimation may entail estimating global motion across sequential recorded video frames, for example based on regions perceived as background, etc. Motion compensation may entail eliminating motion instability from the video stream. For example, camera trajectory smoothing may be performed based on a dominant motion vector between adjacent video frames (e.g., between a pair of consecutive frames), and one or more motion jitter values may be determined for a given frame by subtracting the smoothed camera trajectory computed from the actual position associated with the video frame. Therefore, the camera trajectory may be considered a low pass filter of the input video motion.

Display stabilization subsystem 215 is to employ image processing algorithms and/or hardware motion sensors to induce motion jitter in content frames that compensates a differential between motion jitter experienced by the display device and the viewer of the device. As shown in FIG. 2, display stabilization subsystem 215 includes relative motion jitter estimation logic 220 and compensation logic 290. Relative motion jitter estimation logic 220 may be implemented by application specific integrated circuitry or by programmable integrated circuitry executing software algorithms. In some software embodiments, relative motion jitter estimation logic 220 is implemented in a runtime of an operating system (OS), or application executing within a user space of the OS. Relative motion jitter estimation logic 220 is responsible for estimating relative motion jitter based on image data received from video capture pipeline 210. Estimation of relative motion jitter is advantageously real-time, with the relative motion jitter signal (e.g., one or more vector value) updated with each image data frame analyzed. The estimated relative motion jitter is then output directly to relative motion jitter compensation logic 290, which is responsible for applying a compensating control effort into the content rendering pipeline.

Relative motion jitter compensation logic 290 may be implemented by application specific integrated circuitry or by programmable integrated circuitry executing software. In some software embodiments, relative motion jitter compensation logic 290 is implemented in a runtime of an operating system (OS), or application executing within a user space of the OS. Depending on the embodiment, an output of relative motion jitter compensation logic 290 may be coupled into different points of the content rendering pipeline. For example, in some embodiments an output of display stabilization subsystem 215 comprises frame warping parameters, or another similar set of parameters determined by one or more frame processing techniques that are applied to compensate the estimated relative motion jitter. Advantageously, output of display stabilization subsystem 215 is coupled into an end of content rendering pipeline, reducing latency in the compensation effort. In some exemplary embodiments, output of display stabilization subsystem 215 comprises a frame position offset that impacts positioning of a rendered frame within a display screen. Such a compensation effort may be then be applied with each display frame buffer flip.

In some embodiments further illustrated in FIG. 2, relative motion jitter compensation is enabled/disabled based on output from a compensation controller 240. Controller 240 may be implemented by application specific integrated circuitry or by programmable integrated circuitry executing software. In some software embodiments, controller 240 is implemented in a runtime of an operating system (OS) or application executing within a user space of the OS. In some embodiments, controller 240 is coupled to an output of a device motion jitter detector 243, which is responsible for outputting a device motion jitter signal/data that is indicative of a device motion jitter measured by a micro-electromechanical system (MEMS), or of a device motion jitter estimated through image processing. In some embodiments, device motion jitter detector 243 is a MEMS sensor that includes at least one of an accelerometer or gyroscope, may include both, and may include many of each. In such embodiments, relative motion jitter is determined based on analysis of image data collected by video capture pipeline 210, while display device motion jitter is determined based on separate sensor data. In some alternate embodiments, device motion jitter detector 243 is an image processor operating on frames of image data collected by video capture pipeline 210. For such embodiments, both a relative motion jitter and a device motion jitter are determined based on analysis of frames of image data collected by video capture pipeline 210. Any known video stabilization techniques may be employed at operation 455 to arrive at motion jitter values. For example, device motion jitter may be determined by subtracting a global motion vector estimated over a plurality of image data frames from a motion vector determined based on the current image frame and the prior image frame.

In some embodiments, controller 240 enables/disables relative motion jitter compensation logic 290 based on a comparison of device motion jitter (output from device motion jitter detector 243) and a predetermined device motion jitter threshold 245 stored to memory. For such embodiments, device jitter detector output may be tested against a threshold, and relative motion jitter compensation logic 290 enabled or engaged only if the threshold is satisfied. In response to the device motion jitter failing to satisfy the threshold, motion jitter compensation logic 290 may be disabled such that display content presentation is independent of relative motion jitter. In some further embodiments, controller 240 is to compare a tracked viewer object (e.g., eyes) motion and motion of the display device (e.g., from MEMS sensors) after relative motion jitter compensation logic 290 has been enabled. In response to the user object motion jitter and display device motion jitter satisfying a threshold of difference, and/or in response to the object motion jitter motion satisfying a maximum threshold, relative motion jitter compensation logic 290 is disabled as not useful for that particular environment. In some embodiments controller 240 is to enable/disable motion jitter compensation logic 290 further based on a distance between the tracked viewer object (e.g. eyes) from the display device. For example, controller 240 may disable motion jitter compensation logic 290 if the distance exceeds a maximum threshold since eyes/head positioned sufficiently far from the display screen may benefit less from display motion compensation.

In some further embodiments illustrated with dashed line in FIG. 2, controller 240 comprises, generates, and/or manages an adaptive relative motion jitter model 248, which in some embodiments, is a predictive model of relative motion jitter between the viewer and the display device. The predictive model may, for example, represent transfer function $H_4(s)$ in FIG. 1A, 1B. For such embodiments, device jitter sensor output from device motion jitter detector 243 may be employed as an input to an adaptive relative motion jitter model 248 to estimate a corresponding adaptive relative motion jitter that is output to relative motion jitter compensation logic 290. Predictive models of relative motion jitter may be grounded in the logic that on the time scale of display screen refreshes, a viewer can be expected to be coupled to vehicle platform (as well as display device) in a static manner so as to respond to a motion stimulus experienced by the display in predictable (constant) manner. For such embodiments, input from video capture pipeline 210 may be employed by relative motion jitter estimation logic 220 to ensure the predicative model remains accurate over longer time periods as a viewer shifts their position or otherwise modifies how their head/eyes are coupled to the vehicle platform and/or display device. Relative motion jitter estimation logic 220 need not then be tasked with real time estimation of relative motion jitter. Instead, relative motion jitter may be assessed only periodically.

Figure 3:
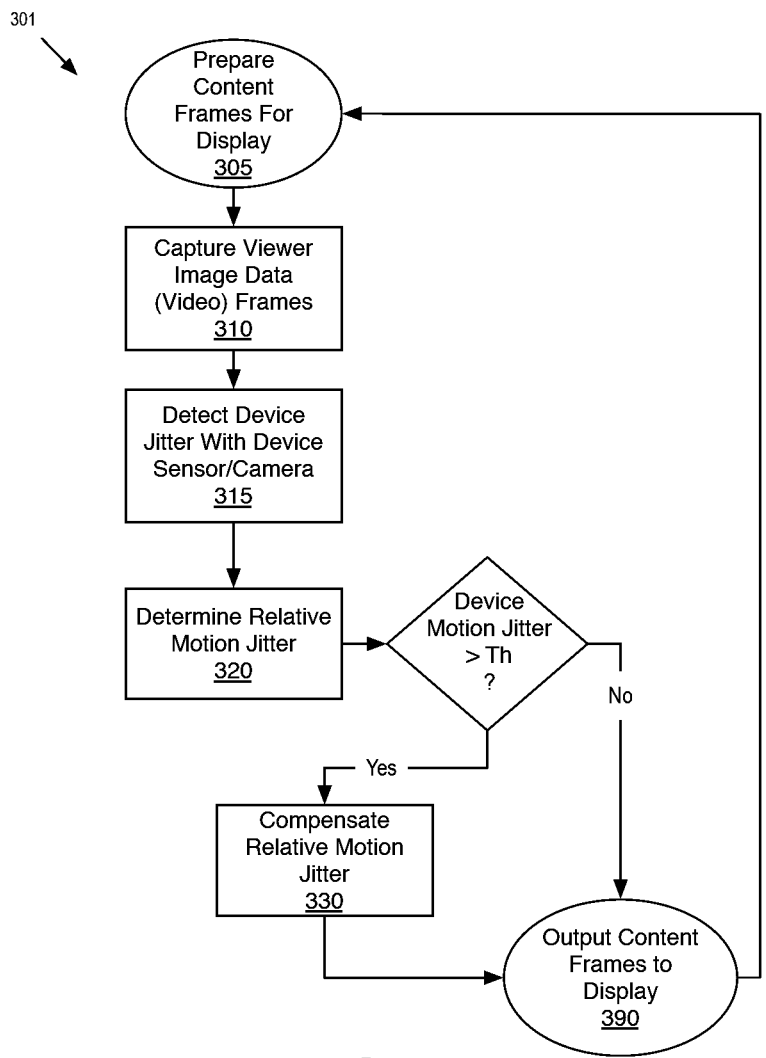
FIG. 3 is a flow diagram of a method for displaying content frames with a display device, in accordance with some embodiments.

FIG. 3 is a flow diagram of a method 301 for displaying content frames with a display device, in accordance with some embodiments. A display device having the architecture 201 introduced in FIG. 2 may perform method 301. Method 301 begins at operation 305 with preparing content frames for display. Any content may be prepared as embodiments are not limited in this respect. The content frames may be completely rendered at operation 305 and, for example ready to be output to a frame buffer.

At operation 310, image data frames are captured, for example with any known video capture pipeline. Operation 310 is advantageously performed concurrently with operation 305, for example as two pipelines. The image data frames captured have a FOV including the display viewer while the viewer is viewing content frames (i.e., the image data frames are captured by a "selfie-cam"). At operation 315, display device motion jitter is detected with a device motion sensor. Operation 315 is advantageously performed concurrently with operation 310. In some embodiments, the device motion jitter is detected with a MEMS sensor that is sampled at some predetermined rate. The MEMS sensor data is then processed to determine a device motion jitter signal/data associated with one or more consecutive image data frames generated at operation 305. In some other embodiments, device motion jitter detection at operation 315 entails processing the image data frames captured at operation 310. For such embodiments, the image processor functions as the device motion sensor. For example, known video stabilization algorithms (e.g., as described above) may be utilized in a stage of a captured video processing pipeline to output a device motion jitter value associated with each collected image data frame.

At operation 320, relative motion jitter is determined. In some embodiments, relative motion jitter is determined concurrently with the capturing/collecting of viewer image data frames. Relative motion jitter may be determined at operation 320 by processing the image data frames captured at operation 310. The image processor functions as the relative motion sensor. For example, object tracking and object motion jitter detection algorithms may be utilized in a stage of a captured video processing pipeline to output a relative motion jitter vector having magnitude and direction associated with each collected image data frame. In other embodiments, relative motion jitter is determined for each collected image data frame based on an estimated relative motion jitter determined from a model function of the device jitter detected at operation 315.

Compensation of the relative motion jitter is then predicated on the device motion jitter. Device motion jitter detected at operation 315 is compared to a predetermined threshold as a control point of method 301. Relative motion jitter is then compensated only if the display device is experiencing significant motion jitter. In the event the device is not experiencing significant motion jitter, it is assumed any relative motion detected at operation 320 is not in response to an input stimulus for which the display compensation is designed. Hence, if the threshold is not satisfied (e.g., detected device motion jitter does not exceed a minimum jitter threshold), then method 301 proceeds to operation 390 where a next content frame is output without applying any relative motion jitter compensation. If instead, the threshold is satisfied (e.g., detected device motion jitter exceeds a minimum threshold), method 301 proceeds to operation 330 where the relative motion jitter associated with the last processed image data frame is compensated. In some embodiments, operation 330 entails computation of an inverted motion vector opposing a relative motion jitter vector determined at operation 320. Method 301 proceeds to operation 390 where a next content frame is output with the relative motion jitter compensation applied to the frame.

Figure 4A:
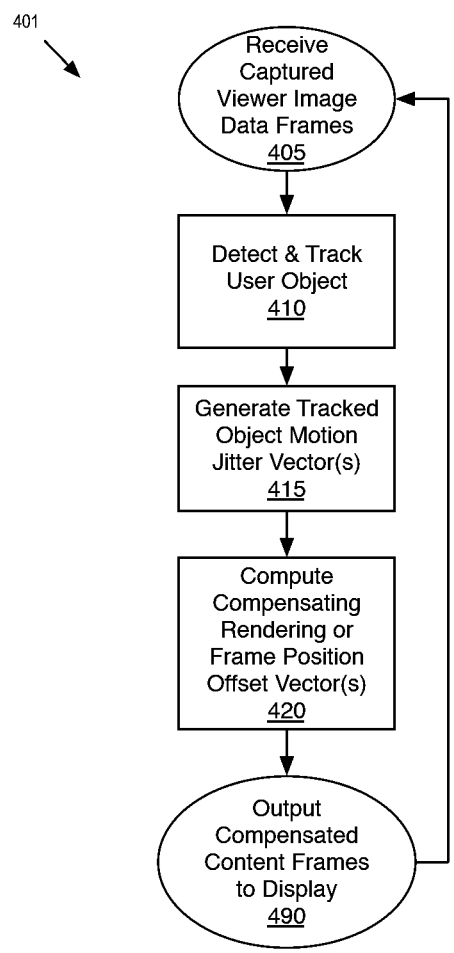
FIG. 4A is a flow diagram of a method for compensating content frames output to a display screen based on both relative motion jitter and device motion jitter, in accordance with some embodiments.

FIG. 4A is a flow diagram of a method 401 for compensating content frames, in accordance with some embodiments. Method 401 may be performed as part of method 301 (FIG. 3), for example. In advantageous embodiments, the operations of method 401 are performed in real-time, for example keeping pace with the lesser of the frame rate associated with the captured image data frames (e.g., 30, 60, 120, fps), and the rate at which content frames are updated (e.g., a content presentation frame rate of 60-100 fps).

Method 401 begins with receiving image (video) data frames at operation 405. The viewer of the display device is captured within the image data frames. In some advantageous embodiments, the viewer image data frames include depth (e.g., $z_1$) information, providing a 3D projection of the viewer relative to one or more cameras integrated into the display device and having a known constant baseline position to a display screen of the device.

At operation 410, a real-time visual object detection and/or tracking algorithm is employed to detect and track the viewer object within consecutive frames. One objective of tracking is to associate objects in consecutive images, based on the detection or tracking of previous image frames. Real-time visual object tracking operation 410 may entail processing the video data stream at the camera frame-rate to determine automatically a bounding box of a given object, or determine that the object is not visible, in each frame.

Visual object tracking may locate an arbitrary object of interest over time in a sequence of images captured from a camera. Adaptive tracking-by-detection methods are widely used in computer vision for tracking arbitrary objects, and any such technique may be employed at operation 410 to track a viewer object. The definition of an "object" can vary from a single instance to a whole class of objects. The viewer's features including, but not limited to, face, eyes (gaze), and/or head may be detected and tracked as the viewer object to determine the location of the viewer in relation to the display screen of the display device. Embodiments may employ any known facial feature detection methods at operation 410, such as, but not limited to, geometry and color-based techniques.

At operation 415, tracked object motion jitter value(s) are determined for a given image data frame. The motion jitter value(s) may be associated with some relative motion over a time interval between consecutive frames. Motion jitter data computed at operation 415 may, for example, comprise a vector determined as a function of a change in relative position of a tracked viewer object (e.g., eyes) between two consecutive frames. The jitter vector may describe both a direction of a tracked object positional change and the magnitude of the positional change. The jitter data may comprise an image frame pixel distance over a plane parallel to that of the device display screen. Jitter data may also comprise a calculated real-world relative positional change or relative motion determined from a measure of image frame pixel distances traveled by the tracked object between frames and a depth value determined for the track object.

In some embodiments, motion jitter data or value(s) for a frame are determined by applying a high-pass filter to motion vector(s) associated with positional changes of the tracked object (e.g., viewer's eyes). Rather than performing a global velocity estimation based on background regions of image frames, a velocity estimate may be limited (e.g., masked) to the track object. This tracked object velocity estimate may be determined over a rolling window of a predetermined number of frames. A relative motion jitter value may then be determined by subtracting the global velocity estimate away from a motion vector computed for the tracked object in a current frame.

At operation 420, a relative motion jitter compensation signal is computed based on the output of operation 415. In some embodiments, compensation operation 420 entails determining a positional offset that may be applied to the content frame to shift the physical position of the frame within a display screen area relative to where the content frame would be otherwise drawn absent the compensation. The content frame positional offset may be in a direction, and by an amount, determined based on the direction and magnitude of the input motion jitter value(s). In some embodiments, the content frame positional shift, or positioning, computed at operation 420 is in a same direction as that of an input motion jitter vector such that when the viewer moves in a direction (e.g., along $x_1$), the content frame is moved in that same direction (e.g., along $x_1$). From a relative motion jitter value, described for example as $\Delta x_4$, $\Delta y_4$, a content frame compensation vector may be applied to offset each pixel p within a content frame (e.g., p'(x,y)=p(x+f($\Delta x_4$),y+f($\Delta y_4$))).

An iteration of method 401 is then completed at operation 490 where the compensating positional offset determined at operation 420 is applied to a content frame ready for output to a display screen. The compensated content frame is then presented on the display screen employing known techniques.

Figure 4B:
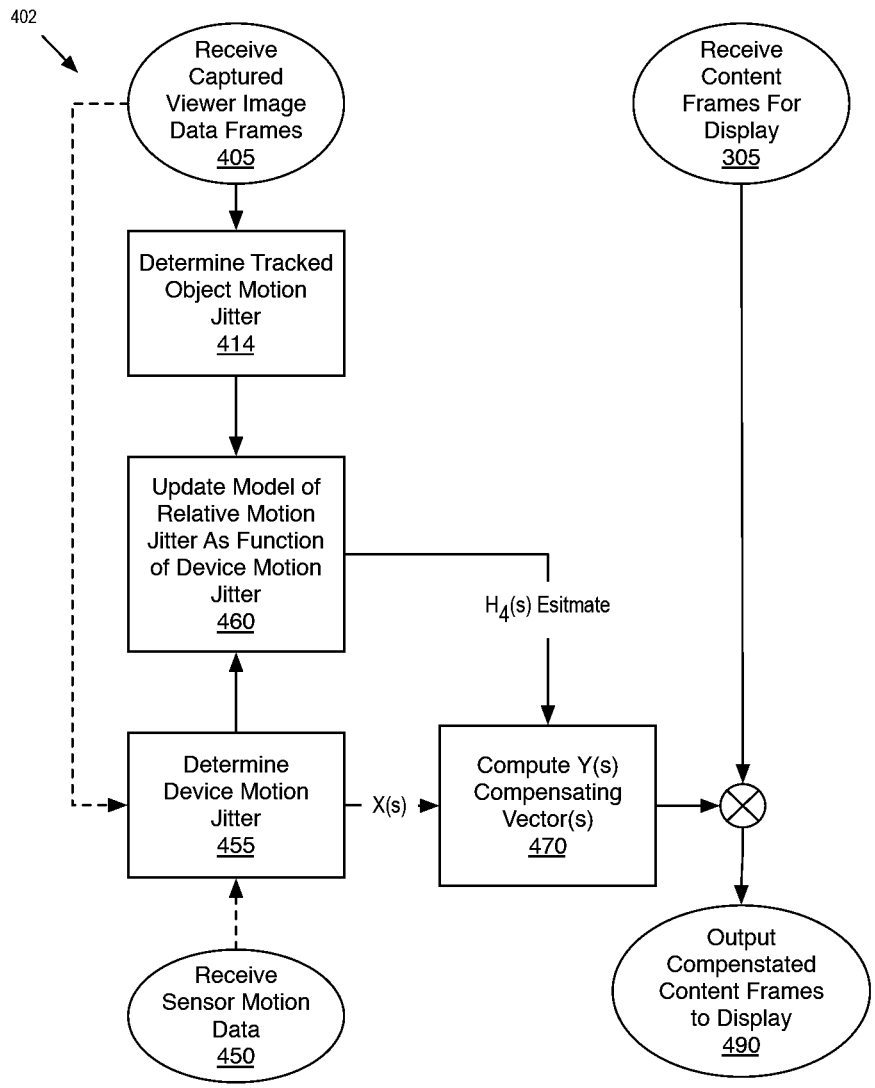
FIG. 4B is a flow diagram of a method for compensating content frames output to a display screen based on both relative motion jitter and device motion jitter, in accordance with some embodiments.

FIG. 4B is a flow diagram of a method 402 for compensating content frames, in accordance with some embodiments. Method 402 may be performed as part of method 301 (FIG. 3), for example. In contrast to compensation method 401, compensation method 402 employs a model of relative motion jitter as a function of device motion jitter. The model may be updated at a rate lower than the rate at which motion jitter compensation is applied to refreshed content frames. As such, method 402 may require relatively less image processing overhead than method 401, and/or may generate a compensation effort with lower latency than method 401. In advantageous embodiments, a subset of operations in method 402 performed at the highest rate are performed in real-time, for example keeping pace with the lesser of the frame rate associated with the captured image data frames (e.g., 30, 60, 120, fps), and the rate at which content frames are updated (e.g., a presentation frame rate of 60-100 fps).

At operation 414, tracked object motion jitter is determined, for example substantially as described above in the context of FIG. 4A. Operation 414 may therefore further entail operations 401 and 415 described above. At operation 455, display device motion jitter is determined. In some embodiments, device motion jitter is determined from MEMS sensor motion data received at operation 450. Embodiments employing MEMs sensor motion data may advantageously determine display device motion jitter with a sampling frequency sufficient to determine motion jitter data at the rate at which content frames received at operation 305 are output to a display screen (e.g., at a refresh rate).

In other embodiments, device motion jitter is determined at operation 405 from video analysis of the plurality of viewer image data frames. Any known image processing techniques may be employed to arrive at a motion jitter value for each consecutive frame in a video sequence. For example, known video stabilization techniques may be employed at operation 455 to arrive at motion jitter values. For such embodiments, both a relative motion jitter (operation 414) and a device motion jitter (operation 455) are determined from analysis of frames of image data collected by the video capture pipeline.

At operation 460, a model of relative motion jitter as a function of device motion jitter is evaluated and/or updated. The model may be updated for example based on a rolling window of frames of captured image data (video) and device motion jitter data mapped to the time periods associated with the image data frames. For example, the relative motion jitter model may be based on a window of a few tens to a hundred or more image data frames, each of which is associated with a corresponding device motion jitter value (determined at operation 455) and a relative motion jitter value (determined at operation 414). For this input data, the transfer function $H_4(s)$ is estimated and a relative motion jitter response $Y(s)$ is predicted on the basis of a display device motion input $X(s)$. In some embodiments, compensation operation 420 entails determining a positional offset that may be applied to the content frame to shift the physical position of the frame within a display screen area relative to where the content frame would be otherwise drawn absent the compensation. The content frame positional offset may be in a direction, and by an amount, determined based on the direction and magnitude of the input motion jitter value(s). In some embodiments, the content frame positional shift, or positioning, computed at operation 420 is in a same direction as that of an input motion jitter vector such that when the viewer moves in a direction (e.g., along $x_1$), the content frame is moved in that same direction (e.g., along $x_1$). From a device motion jitter input, described for example as $\Delta x_1$, $\Delta y_1$, a content frame compensation vector may be applied to offset each pixel p within a content frame (e.g., $p'(x,y)=p(x+f(\Delta x_1),y+f(\Delta y_1))$). The compensated content frames are then output to the display at operation 490.

Operations 450, 455 and 470 may be performed at a rate at least equal to a display frame rate associated with presentation of the content frames at operation 490. Compensation operation 470 may be performed based on the most recent $H_4(s)$ model estimate determined at operation 460. If desired, operations 414 and 460 may be performed at some frequency less than a display frame rate associated with presentation of the content frames to update the model as $H_4(s)$ as it varies over time. Hence, over a first time period (e.g., a training period) device motion jitter and relative motion jitter are determined. A relative motion jitter model generated from these value may then provide a first correlation between the device motion jitter and the relative motion jitter. Subsequently, device motion jitter values are determined over a second time period, and based on the model, relative motion jitter values are estimated over the second time period. Content frames output to the display during the second time period may then be offset within the display screen in directions and distances dependent on the estimated relative jitter.

Later in time (e.g., some time after the corresponding viewer image data frame was captured and the device motion jitter determined for the same time period) the relative motion jitter is determined at operation 414 and the model may be updated at operation 460 based on a second correlation between the relative motion jitter device motion jitter.

Figure 5A:
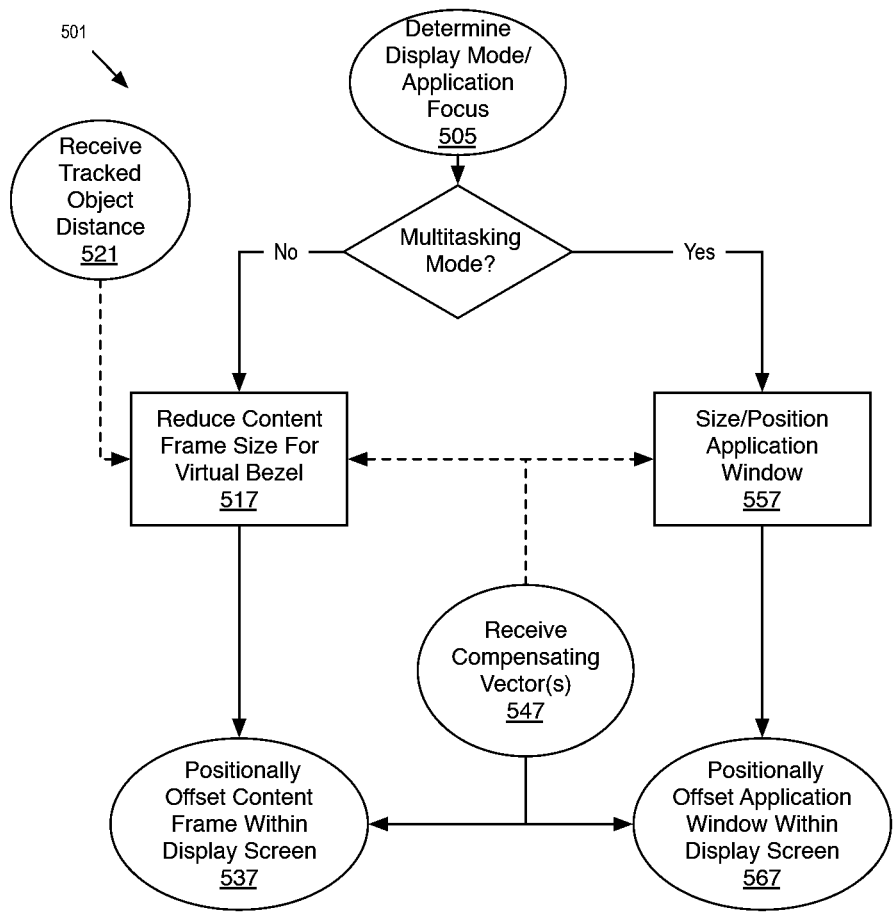
FIG. 5A, is a flow diagram of a method for positioning rendered content frames within the display screen, in accordance with some embodiments.
Figure 5B:
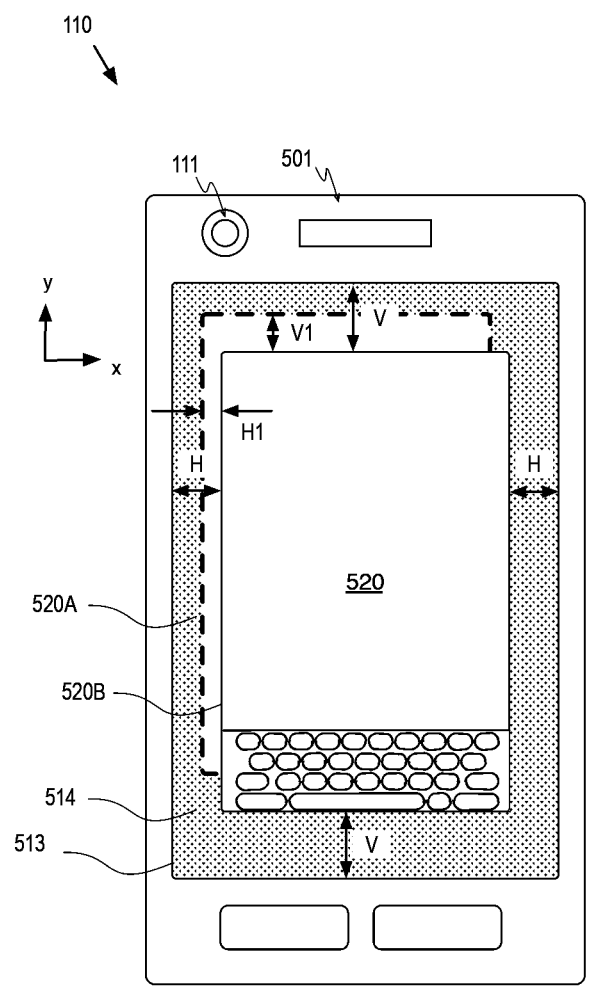
FIGS. 5B and 5C are schematics of a display device illustrating positioning of rendered content frames within the display screen, in accordance with some embodiments.
Figure 5C:
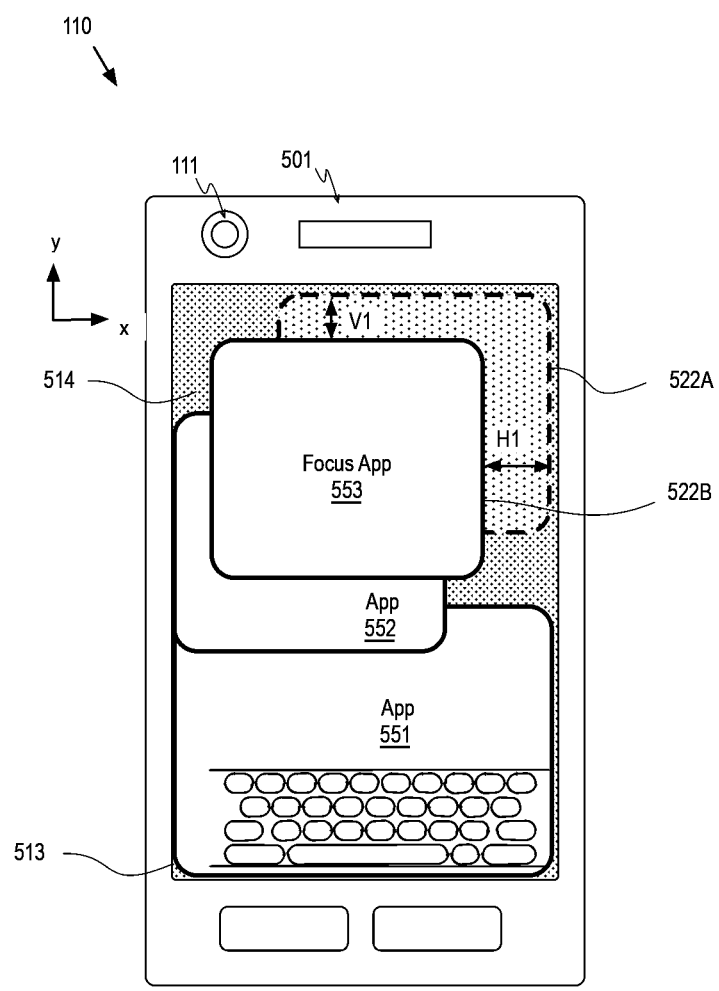

In some embodiments, the relative motion jitter compensation is bounded based on the dimensions of the display and/or an application window, and a size of a virtual bezel surrounding an outer perimeter of a display. Effective motion jitter between a viewers eyes and the device display may be compensated within the limits of the display screen area or application window size. FIG. 5A is a flow diagram of a method 501 for positioning content frames within the display screen, in accordance with some embodiments. FIGS. 5B and 5C are schematics of display device 110 including camera 111 and a display screen 513 integrated into a housing 501 to further illustrate a positioning of rendered content frames in accordance with some embodiments.

Referring first to FIG. 5A, content frame positioning method 501 begins at operation 505 where a display mode and/or application focus of the display device is determined (e.g., from the OS, or display driver, etc.). In some embodiments where the display is in a single-task mode, method 501 proceeds to operation 517 where a size of the content frame is reduced to provide a virtual bezel that is to function as a buffer region within which a content frame may be positioned and re-positioned during content refreshes as a function of the relative motion compensation. FIG. 5B illustrates an exemplary virtual bezel 514 provided by display screen 513 within display device 110. As shown, virtual bezel 514 comprises display screen area surrounding a content frame 520 that is not employed to display the content. In some embodiments, virtual bezel 514 is provided, or not, based on whether motion compensation is enabled or disabled, respectively. In response to disabling display motion compensation, for example when device motion jitter is below a predetermined threshold, content frame 520 is sized to fill the entire area of display screen 513. In response to enabling display motion compensation, a size of content frame 520 is reduced to provide a virtual bezel of sufficient screen area to accommodate an expected maximum positional offset needed for relative motion compensation.

In some embodiments, the content frame size reduction is determined at operation 517 (FIG. 5A) based on a magnitude and/or direction determined from a plurality of compensation vectors received at operation 547. In response to enabling display motion compensation, a plurality of image data frames may be analyzed for purposes of assessing the magnitude of the compensation required before any compensation is applied to the content frames. In some alternative embodiments, content frame size reduction is determined at operation 517 based, at least in part, on an estimated distance to a tracked object (e.g., viewer eyes) received at operation 521. For example, a smaller content frame size reduction (i.e., smaller bezel) may be determined for greater distances between the tracked object and display device.

At operation 537, content frames are positioned within the virtual bezel, for example in a direction dependent on that of the relative motion jitter. As further illustrated in FIG. 5B, a prior content frame 520 has a first position 520A within display screen 514 corresponding to a first relative motion jitter compensation, and a refreshed content frame 520 has a second position 520B. Second content frame position 520B is offset relative to first content frame position 520A by display coordinate offsets $v_1$, $h_1$. In some embodiments, display coordinate offsets $v_1$, $h_1$ are scaled from a relative motion jitter compensation vector components provided in an alternative coordinate system (e.g., a real world space).

Returning to FIG. 5A, in response to a display mode indicating display content is supporting multi-tasking, method 501 proceeds to operation 557 where a size of the window for the application with focus is assessed and repositioned, if necessary. For such embodiments, the size of the content frame display within the focus application window need not be reduced if the initial size of the focus application window allows for sufficient displacement within the display area occupied by non-focus application windows. If an insufficient buffer surrounds the focus application window, the window may be resized as described above and/or repositioned within the display screen area. In some embodiments, only the focus application window position within the display screen is offset to implement display motion compensation. FIG. 5C illustrates an exemplary focus application window 553, which may be smaller than display screen 513 regardless of whether display motion compensation is enabled. In response to enabling display motion compensation, focus application window 553 may be displaced by display coordinate offsets $v_1$, $h_1$ to move between frame position 522A and frame position 522B in compensation of a relative motion jitter input that scales to display coordinate offsets $v_1$, $h_1$. In this exemplary embodiment, coordinate offsets $v_1$, $h_1$ are only applied to focus application window 553 (i.e., non-focus application windows 552 and 551 are not repositioned during a content frame refresh).

Figure 6:
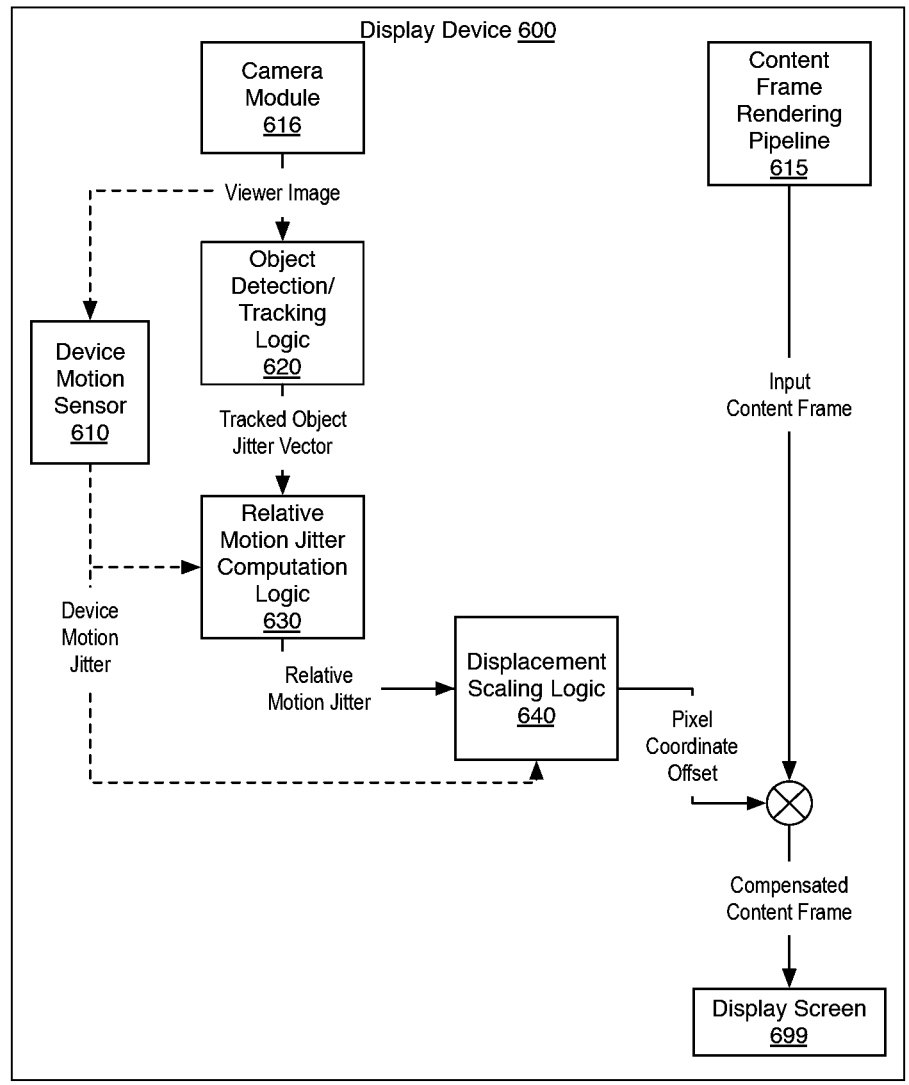
FIG. 6 is a schematic illustrating a display device for compensating content frames output to a display screen, in accordance with some embodiments.

FIG. 6 is a schematic illustrating a display device 600 for compensating content frames output to a display screen based on both relative motion jitter and device motion jitter, in accordance with some embodiments. In some exemplary embodiments, each block illustrated in FIG. 6 represents a circuitry. In some exemplary embodiments, one or more blocks illustrated in FIG. 6 represent software code to be executed by programmable circuitry (e.g., processor).

In device 600, a camera module (CM) 616 generates viewer image data frames that are output to object detection and tracking logic 620. Object detection and tracking logic 620 outputs a tracked object jitter signal/data indicative of relative motion jitter between display device 600 and the device viewer. Relative motion jitter computation logic 630 receives the tracked object jitter data and outputs relative motion jitter signal/data as a function of device motion jitter signal/data received from device motion sensor 610. Device motion sensor 610 may either include a MEMS sensor or an image data frame processor configured for determining the device motion jitter signal/data. Relative motion jitter signal is passed to displacement scaling logic 640 responsible for determining an appropriate positional offset in pixel coordinates of the display screen based on the relative motion jitter signal. The pixel coordinate offset is applied to an input content frame received from content frame rendering pipeline 615, and the compensated content frame is output to display screen 699.

Figure 7:
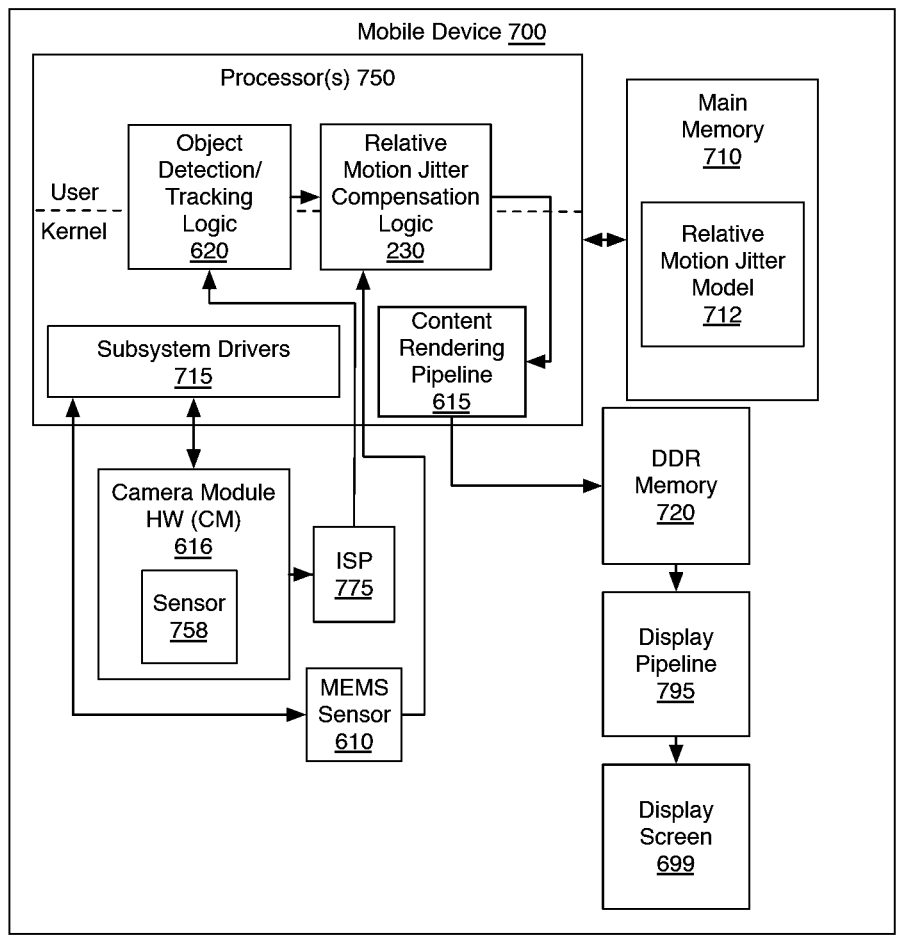
FIG. 7 is a schematic illustrating a mobile device for compensating content frames output to a display screen, in accordance with some embodiments.

FIG. 7 is a schematic illustrating a mobile device 700 for compensating content frames output to a display screen 699, in accordance with some embodiments. FIG. 7 further illustrates how video-assisted motion compensation may be integrated with various other components of a mobile computing device to provide an improved viewer experience. A mobile computing device may refer to any device having a processing system and a mobile power source or supply, such as one or more batteries, for example. Examples of a mobile computing device may include a laptop computer, tablet, touch pad, portable computer, handheld computer, palmtop computer, personal digital assistant (PDA), cellular telephone, combination cellular telephone/PDA, television, smart device (e.g., smartphone, tablet or smart television), mobile internet device (MID), messaging device, data communication device, and so forth. Examples of a mobile computing device also include computers and/or media capture/transmission devices configured to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Mobile device 700 includes CM 616. In the exemplary embodiment, CM 616 further includes a camera sensor 758. Sensor 758 may be a HD, FHD, QXGA, WQXGA, or QSXGA-format digital image device, for example. Camera sensor 758 may provide a color resolution of 10 bits, or more per pixel, is operable to capture continuous video frames progressively. Sensor 758 may have a pixel frequency of 170 MHz, or more. Camera sensor 758 may include an RGB Bayer color filter, an analog amplifier, an A/D converter, other components to convert incident light into a digital signal corresponding to raw image data. Sensor 758 may be controlled to operate a rolling shutter or electronic focal plane shutter process where pixels are read out progressively in a line-sequential fashion for a frame. In exemplary video embodiments, sensor 758 outputs multiple consecutively exposed frames. CM 758 outputs raw data associated with the consecutively exposed frames in conformance with any known streaming protocol, such as a MIPI. Streamed raw video data is input to ISP 775. ISP 775 is to receive and analyze frames of raw video data during the horizontal and/or vertical blanking periods associated with CM 616. During raw image data processing, ISP 775 may perform one or more of color space conversion, noise reduction, pixel linearization, and shading compensation, for example.

Pre-processed video data output by ISP 775 may be buffered in a FIFO manner queued as input image data ready for object tracking. In exemplary embodiments, one or more applications processors (APU) 750 implements one or more of the relative motion compensation blocks depicted in FIG. 6. Processor(s) 750 may for example include one or more fixed function, or semi-programmable logic circuits to perform one or more stages of the object detection/tracking logic 620. A fixed function module or programmable circuit module may be utilized to implement one or more of object detection and object position estimation. In some embodiments, one or more fixed function or programmable logic circuits of processor(s) 750 implement relative motion jitter compensation logic 230. In some embodiments, relative motion jitter compensation logic 230 access/stores in main memory 710 a relative motion jitter model 712. In some embodiments, one or more fixed function or programmable logic circuits of processor(s) 750 implement content rendering pipeline 615. For example, where processor 750 is a SOC, an embedded graphics processor may provide content rendering pipeline 615.

Mobile device 700 further includes one or more MEMS sensor 610. In some embodiments, MEMS sensor 610 includes at least one of an accelerometer or gyroscope, may include both, and may include many of each. In the illustrated embodiment, output from MEMS second 610 is coupled to an input of relative motion jitter compensation logic 230 and is configured to provide device motion jitter data Subsystem drivers 715 within a kernel space of an operating system (OS) instantiated by processor(s) 750 may control various object tracking, device motion jitter processing, and relative motion jitter processing. Access to the object tracking and motion jitter processing parameters may be provided through an application layer executing in a user space of the OS, for example.

Both software and hardware implementations of relative motion jitter compensation are well suited to implementing the display motion compensation methods, for example as described above, at pace with high video and display refresh frame rates. For hardware implementations, object tracking logic 620 and/or relative motion jitter compensation logic 230 may be implemented by fixed function or semi-programmable logic of a hardware accelerator. In some exemplary software embodiments, object tracking logic 620 and/or relative motion jitter compensation logic 230 are instantiated through the user space of processor(s) 750. Processor(s) 750 execute these algorithms at a rate sufficient to perform the object tracking and content compensation in real time with redrawing of content frames. Processor(s) 750 may be programmed with instructions stored on a computer readable media to cause the processor(s) to perform any of the operations described for methods 301, 401, 402, and 501.

As further illustrated in FIG. 7, compensated rendered content frames may be output to DDR memory 720, for example providing a display frame buffer. With a buffer flip, a compensated content frame is output to display screen 699, for example an LCD, or any other known display screen. Any known display output pipeline 795 may be employed as embodiments are not limited in this context.

Figure 8:
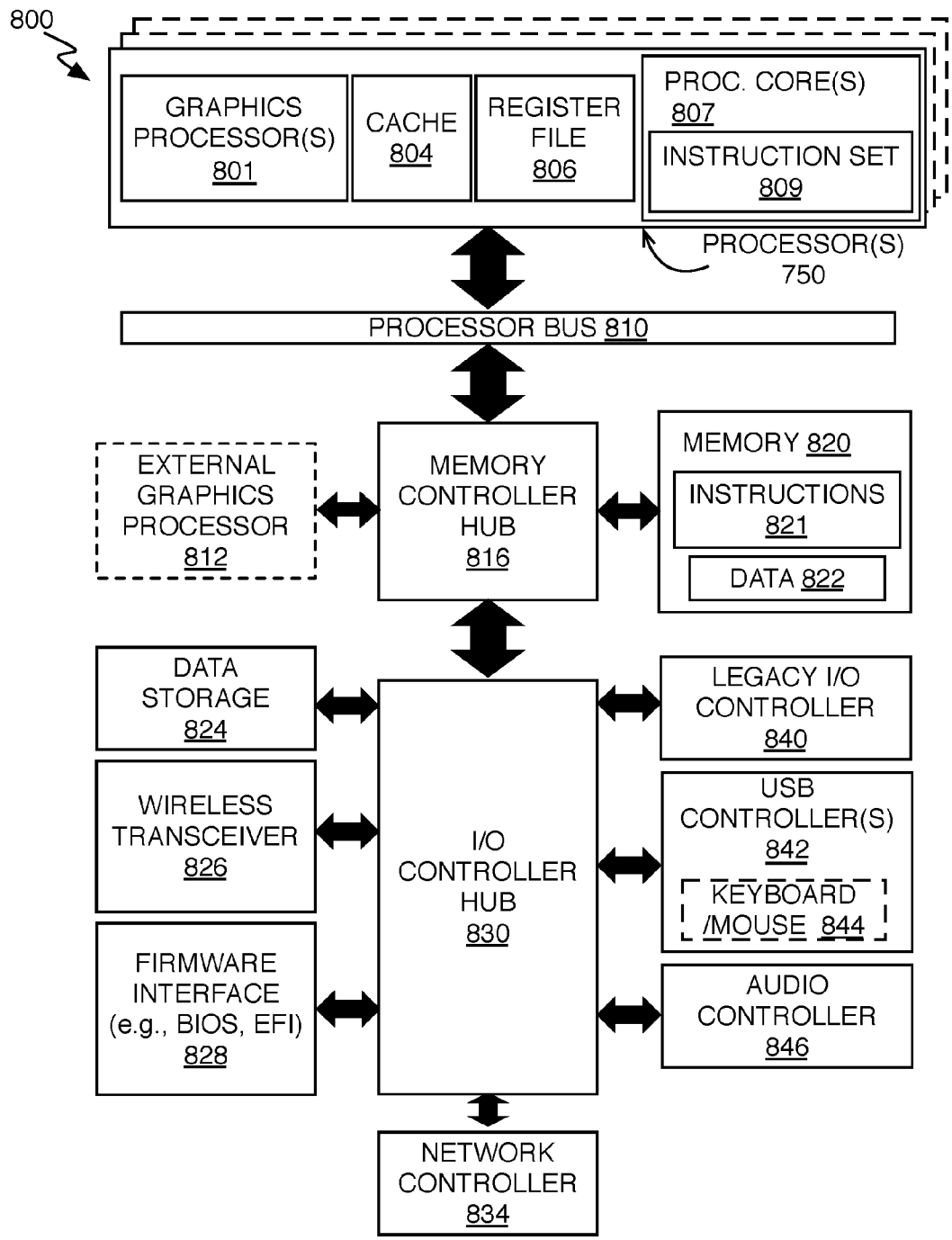
FIG. 8 is a block diagram of a data processing system, according to some embodiments.

FIG. 8 is a block diagram of a data processing system 800 that may be utilized to perform display motion compensation according to some embodiments. Data processing system 800 includes one or more processors 750 and one or more graphics processors 801, and may be a single processor desktop system, a multiprocessor workstation system, or a server system having a large number of processors 750 or processor cores 807. In on embodiment, the data processing system 800 is a SOC integrated circuit for use in mobile, handheld, or embedded devices.

An embodiment of data processing system 800 can include, or be incorporated within a server-based gaming platform, a game console, including a game and media console, a mobile gaming console, a handheld game console, or an online game console. In some embodiments, data processing system 800 is a mobile phone, smart phone, tablet computing device or mobile Internet device. Data processing system 800 can also include, couple with, or be integrated within a wearable device, such as a smart watch wearable device, smart eyewear device, augmented reality device, or virtual reality device. In some embodiments, data processing system 800 is a television or set top box device having one or more processors 750 and a graphical interface generated by one or more graphics processors 801.

In some embodiments, the one or more processors 750 each include one or more processor cores 807 to process instructions which, when executed, perform operations for system and user software. In some embodiments, each of the one or more processor cores 807 is configured to process a specific instruction set 809. In some embodiments, instruction set 809 may facilitate Complex Instruction Set Computing (CISC), Reduced Instruction Set Computing (RISC), or computing via a Very Long Instruction Word (VLIW). Multiple processor cores 807 may each process a different instruction set 809, which may include instructions to facilitate the emulation of other instruction sets. Processor core 807 may also include other processing devices, such a Digital Signal Processor (DSP).

In some embodiments, the processor 750 includes cache memory 804. Depending on the architecture, the processor 750 can have a single internal cache or multiple levels of internal cache. In some embodiments, the cache memory is shared among various components of the processor 750. In some embodiments, the processor 750 also uses an external cache (e.g., a Level-3 (L3) cache or Last Level Cache (LLC)) (not shown), which may be shared among processor cores 807 using known cache coherency techniques. A register file 806 is additionally included in processor 750 which may include different types of registers for storing different types of data (e.g., integer registers, floating point registers, status registers, and an instruction pointer register). Some registers may be general-purpose registers, while other registers may be specific to the design of the processor 750.

In some embodiments, processor 750 is coupled to a processor bus 810 to transmit data signals between processor 750 and other components in system 800. System 800 has a 'hub' system architecture, including a memory controller hub 816 and an input output (I/O) controller hub 830. Memory controller hub 816 facilitates communication between a memory device and other components of system 800, while I/O Controller Hub (ICH) 830 provides connections to I/O devices via a local I/O bus.

Memory device 820 can be a dynamic random access memory (DRAM) device, a static random access memory (SRAM) device, flash memory device, or some other memory device having suitable performance to serve as process memory. Memory 820 can store data 822 and instructions 821 for use when processor 750 executes a process. Memory controller hub 816 also couples with an optional external graphics processor 812, which may communicate with the one or more graphics processors 801 in processors 750 to perform graphics and media operations.

In some embodiments, ICH 830 enables peripherals to connect to memory 820 and processor 750 via a high-speed I/O bus. The I/O peripherals include an audio controller 846, a firmware interface 828, a wireless transceiver 826 (e.g., Wi-Fi, Bluetooth), a data storage device 824 (e.g., hard disk drive, flash memory, etc.), and a legacy I/O controller 840 for coupling legacy devices to the system. One or more Universal Serial Bus (USB) controllers 842 connect input devices, such as keyboard and mouse 844 combinations. A network controller 834 may also couple to ICH 830. In some embodiments, a high-performance network controller (not shown) couples to processor bus 810.

Figure 9:
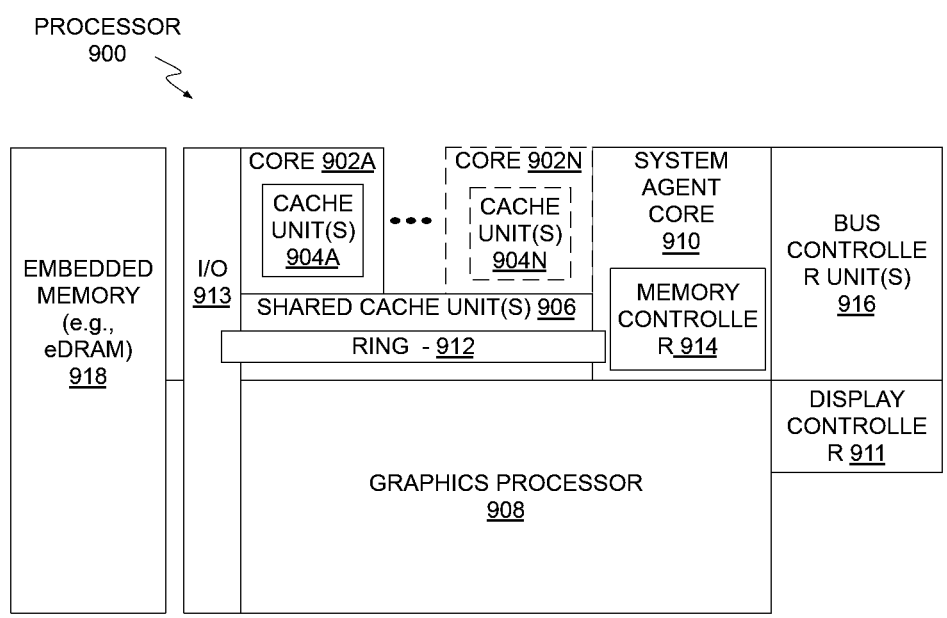
FIG. 9 is a block diagram of an embodiment of a processor having one or more processors cores, an integrated memory controller, and an integrated graphics processor, according to some embodiments.

FIG. 9 is a block diagram of an embodiment of a processor 900 having one or more processors cores 902A-N, an integrated memory controller 914, and an integrated graphics processor 908. Those elements of FIG. 9 having the same reference numbers (or names) as the elements of any other figure herein can operate or function in any manner similar to that described elsewhere herein, but are not limited to such. Processor 900 can include additional cores up to and including additional core 902N represented by the dashed lined boxes. Each of cores 902A-N includes one or more internal cache units 904A-N. In some embodiments each core also has access to one or more shared cached units 906.

The internal cache units 904A-N and shared cache units 906 represent a cache memory hierarchy within the processor 200. The cache memory hierarchy may include at least one level of instruction and data cache within each core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 906 and 904A-N.

In some embodiments, processor 900 may also include a set of one or more bus controller units 916 and a system agent 910. The one or more bus controller units manage a set of peripheral buses, such as one or more Peripheral Component Interconnect buses (e.g., PCI, PCI Express). System agent 910 provides management functionality for the various processor components. In some embodiments, system agent 910 includes one or more integrated memory controllers 914 to manage access to various external memory devices (not shown).

In some embodiments, one or more of the cores 902A-N include support for simultaneous multi-threading. In such embodiment, the system agent 910 includes components for coordinating and operating cores 902A-N during multi-threaded processing. System agent 910 may additionally include a power control unit (PCU), which includes logic and components to regulate the power state of cores 902A-N and graphics processor 908.

In some embodiments, processor 900 additionally includes graphics processor 908 to execute graphics processing operations. In some embodiments, the graphics processor 908 couples with the set of shared cache units 906, and the system agent unit 910, including the one or more integrated memory controllers 914. In some embodiments, a display controller 911 is coupled with the graphics processor 908 to drive graphics processor output to one or more coupled displays. In some embodiments, display controller 911 may be separate module coupled with the graphics processor via at least one interconnect, or may be integrated within the graphics processor 908 or system agent 910.

In some embodiments, a ring based interconnect unit 912 is used to couple the internal components of the processor 900. However, an alternative interconnect unit may be used, such as a point-to-point interconnect, a switched interconnect, or other techniques, including techniques well known in the art. In some embodiments, graphics processor 908 couples with the ring interconnect 912 via an I/O link 913.

The exemplary I/O link 913 represents at least one of multiple varieties of I/O interconnects, including an on package I/O interconnect which facilitates communication between various processor components and a high-performance embedded memory module 918, such as an eDRAM module. In some embodiments, each of the cores 902-N and graphics processor 208 use embedded memory modules 918 as a shared Last Level Cache.

In some embodiments, cores 902A-N are homogenous cores executing the same instruction set architecture. In another embodiment, cores 902A-N are heterogeneous in terms of instruction set architecture (ISA), where one or more of cores 902A-N execute a first instruction set, while at least one of the other cores executes a subset of the first instruction set or a different instruction set.

In some embodiments, processor 900 is a part of, or implemented on, one or more substrates using any of a number of process technologies, for example, Complementary metal-oxide-semiconductor (CMOS), Bipolar Junction/Complementary metal-oxide-semiconductor (BiCMOS) or N-type metal-oxide-semiconductor logic (NMOS). Additionally, processor 200 can be implemented on one or more chips or as a System-On-Chip (SOC) integrated circuit having the illustrated components, in addition to other components.

Figure 10:
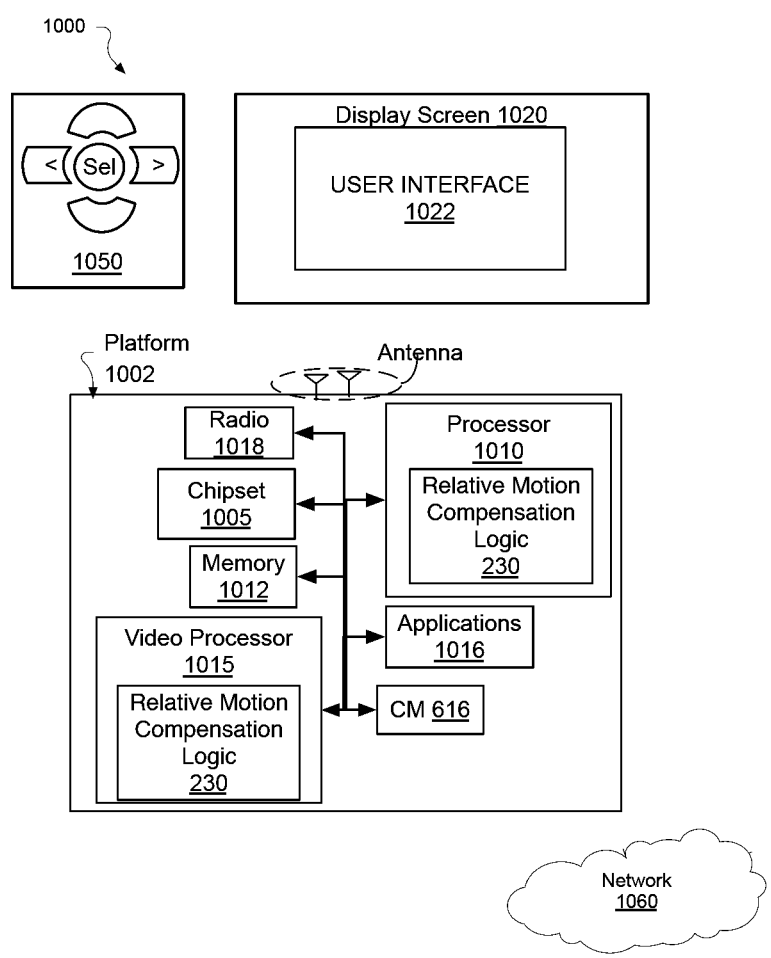
FIG. 10 is a diagram of an exemplary system, arranged in accordance with an embodiment.

FIG. 10 is a diagram of an exemplary system 1000 employing a relative motion compensation logic 230, in accordance with one or more embodiment. System 1000 may be a mobile device although system 1000 is not limited to this context. System 1000 may be incorporated into a wearable computing device, laptop computer, tablet, touch pad, handheld computer, palmtop computer, cellular telephone, smart device (e.g., smart phone, smart tablet or mobile television), mobile internet device (MID), messaging device, data communication device, and so forth. System 1000 may also be a connected vehicle infrastructure device. For example, system 1000 may be incorporated into an automobile.

System 1000 includes a device platform 1002 that may implement all or a subset of the various display compensation methods described above in the context of FIG. 1-FIG. 7. In various exemplary embodiments, video processor 1015 executes object tracking motion jitter estimation, for example as described elsewhere herein. Processor 1010 includes motion compensation logic circuitry 230 to rapidly shift content frames within a display window based on both device motion jitter and relative motion jitter, for example as described elsewhere herein. In some embodiments, one or more computer readable media may store instructions, which when executed by processor 1010 and/or video processor 1015, cause the processor(s) to execute one or more of the display compensation operations described elsewhere herein. One or more image data frames exposed or captured by CM 616 may then be stored in memory 1012 in association with motion jitter data.

In embodiments, device platform 1002 is coupled to a display screen 1020. Platform 1002 may collect raw image data with CM 616, as well as generate content frames and output them to display screen 1020. A navigation controller 1050 including one or more navigation features may be used to interact with, for example, device platform 1002 and/or display screen 1020. Display screen 1020 may include, for example, a liquid crystal display screen, an LED display screen, or a touch screen display.

In embodiments, device platform 1002 may include any combination of CM 616, chipset 1005, processors 1010, 1015, memory/storage 1012, applications 1016, and/or radio 1018. Chipset 1005 may provide intercommunication among processors 1010, 1015, memory 1012, video processor 1015, applications 1016, or radio 1018.

Memory 1012 may be implemented as a volatile memory device such as, but not limited to, a Random Access Memory (RAM), Dynamic Random Access Memory (DRAM), or Static RAM (SRAM). Memory 1012 may also be implemented as a non-volatile storage device such as, but not limited to flash memory, battery backed-up SDRAM (synchronous DRAM), magnetic memory, phase change memory, and the like.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

The relative motion jitter logic and associated display content frame compensation processes comporting with exemplary embodiments described herein may be implemented in various hardware architectures, cell designs, or "IP cores."

As exemplified above, embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood as physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

The following paragraphs briefly describe some exemplary embodiments:

In one or more first embodiments, a display device comprise a display screen to output content frames, a camera module (CM) to capture image data frames, and one or more processors coupled to the display screen and CM, the processors to: track a position of an object in the image data frames; determine a relative motion jitter between the device and the tracked object; determine a device motion jitter, and compensate the relative motion jitter by positioning rendered content frames within the display screen, based on both the relative motion jitter and the device motion jitter.

In furtherance of the first embodiments, the processors are further to render the content frames to fill less than the entire display screen area, position a first content frame within the display screen area to surround the first content frame with a virtual bezel comprising display screen area not employed to display the first content frame, and offset a position of subsequent content frames within the virtual bezel in a direction dependent on that of the relative motion jitter.

In furtherance of the first embodiments, the processors are further to determine a size of the content frames, or a size of the virtual bezel based on at least one of the magnitude of the relative motion jitter or an estimated distance between the tracked object and the display device.

In furtherance of the first embodiments, the processors are to determine the device motion jitter and relative motion jitter over a first time period, determine a first correlation between the device motion jitter and the relative motion jitter over the first time period, determine the device motion jitter over a second time period, estimate the relative motion jitter over the second time period based on the first correlation, and offset positions of subsequent content frames within the display screen in directions and distances dependent on the estimated relative motion jitter.

In furtherance of the first embodiments, the processors are to position content frames within the display screen based on the relative motion jitter in response to the device motion jitter satisfying the threshold, and position content frames within the display screen independent of the relative motion jitter in response to the device motion jitter failing to satisfy the threshold.

In furtherance of any one of the first embodiments, the processors are to determine the device jitter based on output from a micro-electro-mechanical system (MEMS) of the device, or based on an estimate of global motion determined from the image data frames, determine a first correlation between the device motion jitter and the relative motion jitter over the first time period, determine the device motion jitter over a second time period, estimate the relative motion jitter over the second time period based on the first correlation, and offset positions of subsequent content frames within the display screen in directions and distances dependent on the estimated relative motion jitter.

In furtherance of the embodiment immediately above, the processors are to determine the relative motion jitter over the second time period, and determine a second correlation between the device motion jitter and the relative motion jitter over the second time period, update a model of the relative motion jitter as a function of device motion jitter based on the second correlation, and offset positions of subsequent content frames within the display screen in directions and distances dependent on the updated model and subsequent determinations of the device motion jitter.

In furtherance of the first embodiments, the estimate of global motion includes a dominant motion vector between consecutive image data frames, and the processors are to determine the device motion jitter by subtracting a global motion estimated over the plurality of image data frames from a motion vector determined based on the current image frame and the prior image frame.

In one or more second embodiment, a method for displaying content frames with a display device includes capturing a plurality of sequential image data frames with a camera module (CM) of the display device. The method includes tracking a position of an object within the image data frames. The method includes determining a relative motion jitter between the device and the tracked object. The method includes determining a device motion jitter based on output from a micro-electro-mechanical system (MEMS) of the display device or based on an estimate of global motion determined through analysis of the image data frames. The method includes positioning rendered content frames within the display screen, based on both the relative motion jitter and the device motion jitter to compensate the relative motion jitter.

In furtherance of the second embodiment, the positioning further comprises rendering the content frames to fill less than an entire area of the display screen, positioning a first content frame within the display screen area to surround the first content frame with a virtual bezel comprising display screen area not employed to display the first content frame, and offsetting positions of subsequent content frames within the virtual bezel in directions and distances dependent on the relative motion jitter.

In furtherance of the embodiment immediately above, the method further comprises determining a size of the content frames, or a size of the virtual bezel based on at least one of the magnitude of the relative motion jitter or an estimated distance between the tracked object and the display device.

In furtherance of the second embodiments, the positioning further comprises comparing the device motion jitter to a predetermined threshold, positioning content frames within the display screen based on the relative motion jitter in response to the device motion jitter satisfying the threshold, and positioning content frames within the display screen independent of the relative motion jitter in response to the device motion jitter failing to satisfy the threshold.

In furtherance of any one of the second embodiments, the positioning further comprises determining the device motion jitter and relative motion jitter over a first time period, determining a first correlation between the device motion jitter and the relative motion jitter over the first time period, determining the device motion jitter over a second time period, estimating the relative motion jitter over the second time period based on the first correlation, and offsetting positions of subsequent content frames within the display screen in directions and distances dependent on the estimated relative motion jitter.

In furtherance of the embodiments immediately above, positioning content frames within the display screen based on both the relative motion jitter and the device motion jitter further comprises determining the relative motion jitter over the second time period, and determining a second correlation between the device motion jitter and the relative motion jitter over the second time period, updating a model of the relative motion jitter as a function of device motion jitter based on the second correlation, and offsetting positions of subsequent content frames within the display screen in directions and distances dependent on the updated model and subsequent determinations of the device motion jitter.

In furtherance of the embodiments immediately above, capturing image data frames with the CM further comprises capturing image data frames including one or more eyes of a viewer of the device, and tracking the position of an object within the image data frames further comprises tracking the position of the viewer's eyes over a plurality of the image data frames.

In furtherance of the embodiments immediately above, determining the device motion jitter further comprises a computation of motion jitter values through analysis of the image data frames, the computation including subtracting a global motion vector estimated over a plurality of image data frames from a motion vector determined based on the current image frame and the prior image frame.

In one or more third embodiment, a non-transitory computer-readable media, with instruction stored thereon, which when executed by one or more processors of a device, cause the device to perform a method comprising capturing a plurality of sequential image data frames with a camera module (CM) of the device, tracking a position of an object within the image data frames, determining a relative motion jitter between the display device and the tracked object, determining a device motion jitter based on output from a micro-electro-mechanical system (MEMS) of the display device or based on an estimate of global motion determined through analysis of the image data frames, and positioning rendered content frames within the display screen, based on both the relative motion jitter and the device motion jitter to compensate the relative motion jitter.

In furtherance of the third embodiments, the media further comprises instructions to cause the one or more processors to further perform the method further comprising comparing the device motion jitter to a predetermined threshold, positioning content frames within the display screen based on the relative motion jitter in response to the device motion jitter satisfying the threshold, and positioning content frames within the display screen independent of the relative motion jitter in response to the device motion jitter failing to satisfy the threshold.

In furtherance of the third embodiments, the media further comprises the instructions for positioning content frames within the display screen based on the relative motion jitter further comprises instructions for performing the method further comprising capturing a plurality of sequential image data frames with a camera module (CM) of the display device, tracking a position of an object within the image data frames, determining a relative motion jitter between the device and the tracked object, determining a device motion jitter based on output from a micro-electro-mechanical system (MEMS) of the display device or based on an estimate of global motion determined through analysis of the image data frames, and positioning rendered content frames within the display screen, based on both the relative motion jitter and the device motion jitter to compensate the relative motion jitter.

In furtherance of the embodiment immediately above, the instructions for positioning content frames within the display screen based on the relative motion jitter further comprises instructions for performing the method further comprising determining the device motion jitter and relative motion jitter over a first time period, determining a first correlation between the device motion jitter and the relative motion jitter over the first time period, determining the device motion jitter over a second time period, estimating the relative motion jitter over the second time period based on the first correlation, and offsetting positions of subsequent content frames within the display screen in directions and distances dependent on the estimated relative motion jitter.

In one or more fourth embodiments, a display device comprises a means to perform the method recited in one of the second embodiments.

In one or more fifth embodiments, a computer-readable media has instruction stored thereon, which when executed by one or more processors of a device, cause the device to perform one of the methods recited in any one of the second embodiments.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. A display device, comprising:
  a display screen to output content frames;
  a camera module (CM) to capture image data frames; and
  one or more processors coupled to the display screen and CM, the processors to:
    track a position of an object in the image data frames;
    determine a relative motion jitter between the device and the tracked object;
    determine a device motion jitter;
    compare the device motion jitter to a predetermined minimum device motion jitter threshold; and
    compensate the relative motion jitter by:
      positioning rendered content frames within the display screen based on the relative motion jitter in response to the device motion jitter satisfying the threshold; and
      positioning content frames within the display screen independent of the relative motion jitter in response to the device motion jitter failing to satisfy the threshold.

2. The display device of claim 1, wherein the processors are further to:
  render the content frames to fill less than the entire display screen area;
  position a first content frame within the display screen area to surround the first content frame with a virtual bezel comprising display screen area not employed to display the first content frame; and
  offset a position of subsequent content frames within the virtual bezel in a direction dependent on that of the relative motion jitter.

3. The display device of claim 2, wherein the processors are further to:
  determine a size of the content frames, or a size of the virtual bezel based on at least one of the magnitude of the relative motion jitter or an estimated distance between the tracked object and the display device.

4. The display device of claim 1, wherein the processors are to:
  determine the device motion jitter and relative motion jitter over a first time period;
  determine a first correlation between the device motion jitter and the relative motion jitter over the first time period;
  determine the device motion jitter over a second time period;
  estimate the relative motion jitter over the second time period based on the first correlation; and
  offset positions of subsequent content frames within the display screen in directions and distances dependent on the estimated relative motion jitter.

5. The display device of claim 1, wherein the processors are to:
  determine the device motion jitter based on output from a micro-electro-mechanical system (MEMS) embedded in the device, or based on an estimate of global motion determined from the image data frames
  determine a first correlation between the device motion jitter and the relative motion jitter over the first time period;
  determine the device motion jitter over a second time period;
  estimate the relative motion jitter over the second time period based on the first correlation; and
  offset positions of subsequent content frames within the display screen in directions and distances dependent on the estimated relative motion jitter.

6. The display device of claim 5, wherein the processors are to:
  determine the relative motion jitter over the second time period; and
  determine a second correlation between the device motion jitter and the relative motion jitter over the second time period;
  update a model of the relative motion jitter as a function of device motion jitter based on the second correlation; and
  offset positions of subsequent content frames within the display screen in directions and distances dependent on the updated model and subsequent determinations of the device motion jitter.

7. The display device of claim 1, wherein:
  the relative motion jitter is determined based on analysis of the image data frames; and
  the device motion jitter is determined by subtracting a global motion vector estimated over a plurality of image data frames from a motion vector determined based on a current image frame and the prior image frame.

8. A method for displaying content frames with a display device, the method comprising:
  capturing a plurality of sequential image data frames with a camera module (CM) of the display device;
  tracking a position of an object within the image data frames;
  determining a relative motion jitter between the device and the tracked object;
  determining a device motion jitter; and
  positioning rendered content frames within the display screen, wherein the positioning further comprises:
    comparing the device motion jitter to a predetermined minimum device motion jitter threshold;

positioning content frames within the display screen based on the relative motion jitter in response to the device motion jitter satisfying the threshold; and positioning content frames within the display screen independent of the relative motion jitter in response to the device motion jitter failing to satisfy the threshold.

9. The method of claim 8, wherein the positioning further comprises:

rendering the content frames to fill less than an entire area of the display screen;

positioning a first content frame within the display screen area to surround the first content frame with a virtual bezel comprising display screen area not employed to display the first content frame; and offsetting positions of subsequent content frames within the virtual bezel in directions and distances dependent on the relative motion jitter.

10. The method of claim 9, further comprising determining a size of the content frames, or a size of the virtual bezel based on at least one of the magnitude of the relative motion jitter or an estimated distance between the tracked object and the display device.

11. The method of claim 8, wherein the positioning further comprises:

determining the device motion jitter and relative motion jitter over a first time period;

determining a first correlation between the device motion jitter and the relative motion jitter over the first time period;

determining the device motion jitter over a second time period;

estimating the relative motion jitter over the second time period based on the first correlation; and offsetting positions of subsequent content frames within the display screen in directions and distances dependent on the estimated relative motion jitter.

12. The method of claim 11, wherein positioning content frames within the display screen based on both the relative motion jitter and the device motion jitter further comprises:

determining the relative motion jitter over the second time period; and determining a second correlation between the device motion jitter and the relative motion jitter over the second time period;

updating a model of the relative motion jitter as a function of device motion jitter based on the second correlation; and offsetting positions of subsequent content frames within the display screen in directions and distances dependent on the updated model and subsequent determinations of the device motion jitter.

13. The method of claim 8, wherein:

capturing image data frames with the CM further comprises capturing image data frames including one or more eyes of a viewer of the device; and tracking the position of an object within the image data frames further comprises tracking the position of the viewer's eyes over a plurality of the image data frames.

14. The method of claim 8, wherein determining the device motion jitter further comprises a computation of motion jitter values through analysis of the image data frames, the computation including subtracting a global motion vector estimated over a plurality of image data frames from a motion vector determined based on the current image frame and the prior image frame.

15. A non-transitory computer-readable media, with instructions stored thereon, which when executed by one or more processors of a device, cause the device to perform a method comprising:

capturing a plurality of sequential image data frames with a camera module (CM) of the device;

tracking a position of an object within the image data frames;

determining a relative motion jitter between the display device and the tracked object;

determining a device motion jitter comparing the device motion jitter to a predetermined minimum device motion jitter threshold;

positioning content frames within the display screen based on the relative motion jitter in response to the device motion jitter satisfying the threshold; and positioning content frames within the display screen independent of the relative motion jitter in response to the device motion jitter failing to satisfy the threshold.

16. The media of claim 15, wherein the instructions for positioning content frames within the display screen based on the relative motion jitter further comprises instructions for performing the method further comprising:

determining the device motion jitter and relative motion jitter over a first time period;

determining a first correlation between the device motion jitter and the relative motion jitter over the first time period;

determining the device motion jitter over a second time period;

estimating the relative motion jitter over the second time period based on the first correlation; and offsetting positions of subsequent content frames within the display screen in directions and distances dependent on the estimated relative motion jitter.

* * * * *